Jan. 14, 1936.                T. J. HORGAN                2,027,690
                            VEHICLE HEADLIGHT
                            Filed Jan. 23, 1934
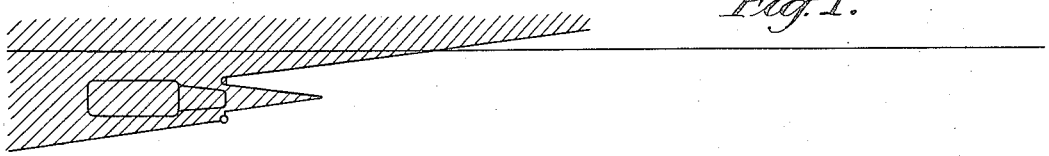
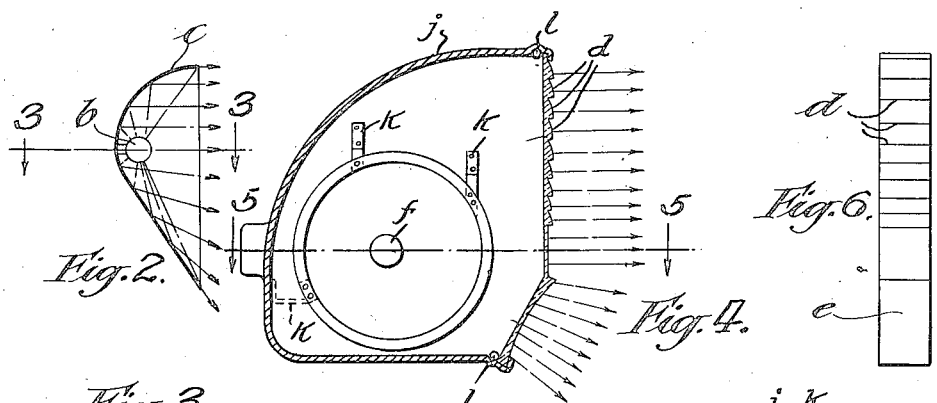
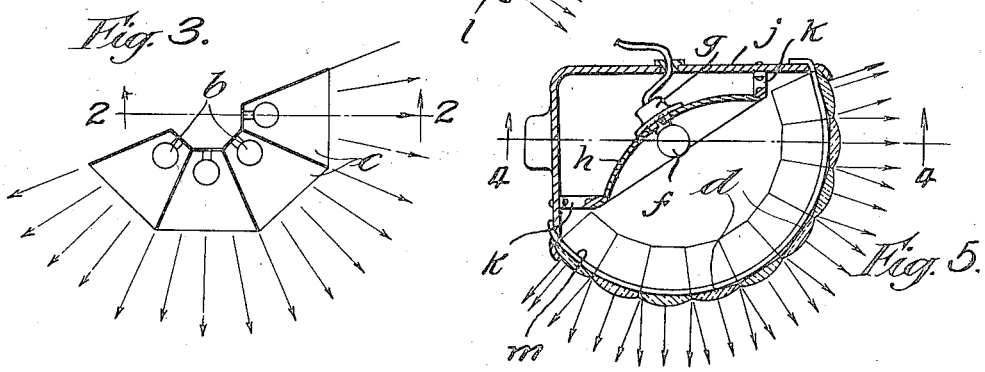

Patented Jan. 14, 1936

2,027,690

UNITED STATES PATENT OFFICE 2,027,690

VEHICLE HEADLIGHT

Timothy Joseph Horgan, Westminster, London, England

Application January 23, 1934, Serial No. 707,965
In Great Britain January 24, 1933

4 Claims. (Cl. 240—41.3)

This invention relates to headlights particularly for motor vehicles and has for its object to provide an improved form of "anti-dazzle" or "anti-glare" headlamp.

The invention is based upon the observation that dazzle effects do not, as is commonly believed, depend upon intrinsic brightness, but upon contrast between the brilliance of the light source and the surrounding blackness or shadow. This factor has to some extent been recognized by some research workers who have attempted to solve the problem of dazzle by providing auxiliary lamps to illuminate the roadway in the neighbourhood of the vehicle and in rear of the head-lamps. These arrangements, however, are not satisfactory since they give rise to several regions of contrast each of which contributes its dazzle effect and in consequence have not been adopted in practice with the result that in cases where any attempt at all is made to deal with the trouble due to dazzle or glare, dipping or switching off the headlights is now universally practiced.

The present invention provides a solution by means of a particular construction of lamp and I eliminate the necessity for any manipulation by the driver such as is involved in dipping or switching off.

The invention consists in a vehicle head-lamp comprising as a self-contained unit a source of illumination and means whereby the rays from this source may be projected forwardly, laterally, and rearwardly so as to secure illumination of a considerable stretch or area of road surface in the neighbourhood of the vehicle without any regions of contrast therein which cause the effect of glare or dazzle to the driver of an on-coming vehicle, while at the same time contributing to the comfort of the driver of the vehicle fitted with the improved head-lamp.

The invention also consists in a vehicle headlamp according to the preceding paragraph in which the rays are also projected partly downwardly.

Further features of the invention will be apparent from the description given hereafter.

The accompanying drawing illustrates several modes of carrying out the invention.

Figure 1 shows diagrammatically how the dazzle effects due to regions of contrast produced by an ordinary headlight are eliminated by the illumination produced by this invention.

Figure 2 is a section on the line 2—2 of Figure 3 showing one form of head-lamp in accordance with the invention, and Figure 3 is a section on the line 3—3 of Figure 2.

Figure 4 is a section on the line 4—4 of Figure 5 showing another form of head-lamp in accordance with the invention.

Figure 5 is a section on the line 5—5 of Figure 4, and

Figure 6 is a front view of a unit of the lamp shown in Figures 4 and 5.

In carrying my invention into effect in one convenient manner as shown in Figures 2 and 3, I form my improved head-lamp with any usual or desired casing (not shown) within which is incorporated one or more lamps $b$ together with a combination of one or more reflectors $c$ so disposed and shaped as to direct the light rays not only ahead of the vehicle in the usual manner but also to the side or sides and towards the rear of the vehicle, the lateral and rearward rays (and the forward rays if necessary) being if desired projected somewhat downwardly as shown in Figure 2 so that in this way I secure illumination of the road surface at the side and towards the rear of the vehicle and so eliminate dark shadows and consequently the glare from the head-lamp when viewed from a point ahead of the vehicle.

In place of employing reflectors which may in some cases be formed by the outer casing I may form my self-contained unit as shown in Figures 4 to 6 with a combination of lenses or portions of lenses suitably disposed round the lamp or lamps to effect the distribution of the light rays in the manner described above. Thus, for example, in one specific construction the lamp may be located at the common focus of a number of segments of plano-convex lenses superimposed above one or more segments of plano-concave lenses set at a slightly backward inclination, the whole being disposed round the lamp in such a manner that the plano-convex lenses throw out strong horizontal rays of light in the desired directions and at a convenient height above ground level while the inclined plano-concave lenses diffuse the light rays on to the road surface and surrounding areas.

The lamp $f$ is supported in any usual lamp holder $g$, the latter being carried by a reflector $h$ attached to the lamp casing $j$ by arms $k$. Conveniently the lens system may comprise a plurality of strips (one of which is shown in Figure 6) each having its upper part formed or provided with the plano-convex cylindrical lens segments $d$ while the lower part is formed as a plano-concave cylindrical segment $e$ or as a plurality of such segments and the strips are disposed in a circular formation in the lamp casing $j$ as shown in Figure 5 so that the lamp $f$ or source of illumination will be at the common focus of all the lens segments. The lens strips are retained in the casing $j$ as by means of spring clips $l$, $m$.

In some cases it may be desirable to provide for an increasing intensity of light towards the rear of the vehicle so as to make its glare-reducing effect upon the forward rays more pronounced and any suitable means may be adopted for this purpose.

The invention consists in a head-lamp formed as a self-contained unit and adapted to project light rays forwardly, laterally and rearwardly and preferably partly downwardly, and any convenient construction may be adopted to give effect to the principle underlying the invention so that it will be understood that the foregoing details of construction are given purely by way of illustration of the nature of the invention and must not be taken as having any limiting effect upon the scope of the invention.

Having now described my invention what I claim as new and desire to secure by Letters Patent is:

1. A vehicle headlamp comprising in combination an outer casing, a source of illumination, means for supporting said source of illumination within said casing, and light directing means having a substantially rectangular projection on a vertical plane mounted in said casing, and comprising a combination of lenses formed in a plurality of strips disposed in a circular formation around said light source to project light rays emanating from said source as an uninterrupted beam forwardly, laterally and rearwardly in order to secure illumination of a considerable stretch or area of road surface in the neighbourhood of the vehicle without any regions of contrast therein.

2. A vehicle headlamp as claimed in claim 1, in which the lower part of each lens strip is arranged to direct light rays downwardly.

3. A vehicle headlamp comprising in combination an outer casing, light directing means attached to said casing and comprising a plurality of segments of plano-convex lenses disposed in circular formation and superimposed above a plurality of segments of plano-concave lenses set at a slightly backward inclination, and a light source located and supported at a common focus of said plano-convex lens segments, said plano-convex lens segments acting to project strong horizontal light rays and said plano-concave lens segments acting to project diffused inclined light rays, the whole of said projected light rays composing an uninterrupted beam directed forwardly, laterally and rearwardly of the vehicle to illuminate a considerable stretch or area of road surface in the neighbourhood of the vehicle without any regions of contrast.

4. A vehicle headlamp as claimed in claim 3, in which the light directing means comprises a plurality of lens strips each having an upper part formed with plano-convex lens segments and a lower part formed as a plano-concave lens segment.

TIMOTHY JOSEPH HORGAN.